Sept. 27, 1949.　　　　　F. G. PAULLY　　　　　2,483,299
MEASUREMENT OF ELECTROCHEMICAL POTENTIALS
Filed Aug. 25, 1945
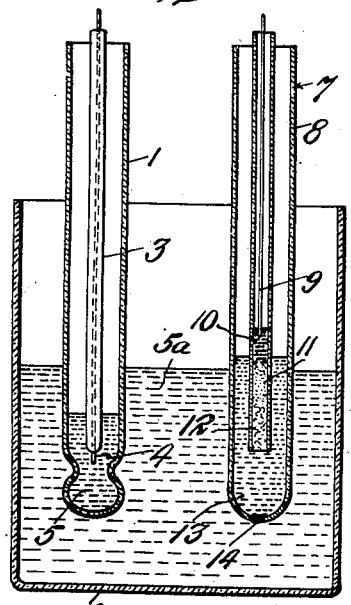
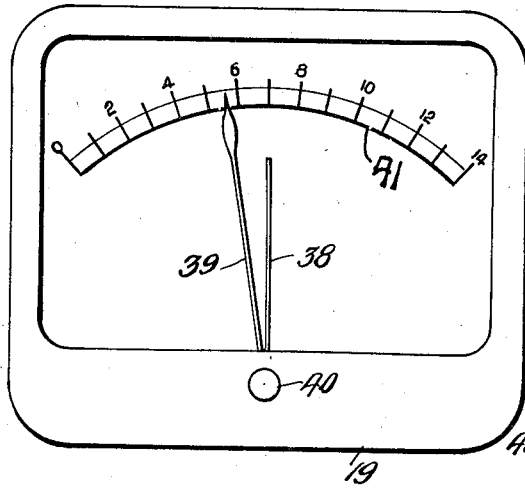
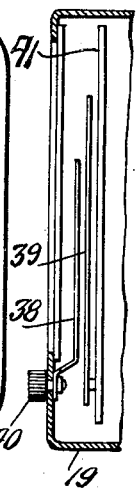
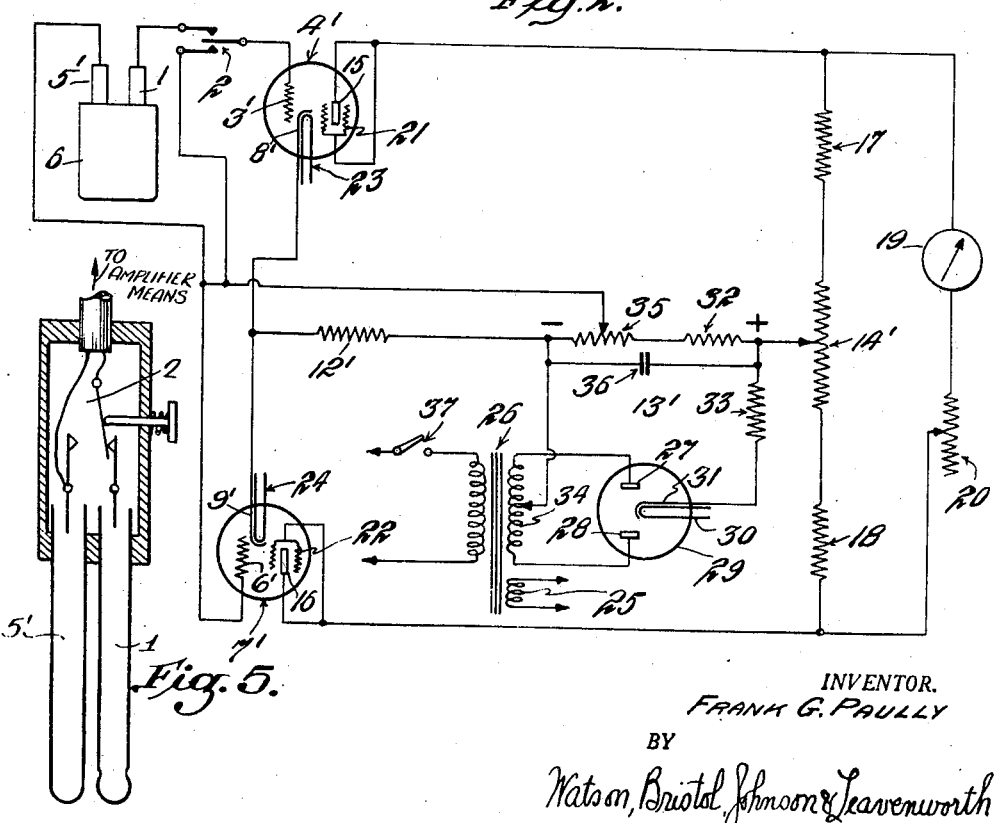
INVENTOR.
FRANK G. PAULLY
BY
Watson, Bristol, Johnson & Leavenworth
ATTORNEY Patented Sept. 27, 1949

2,483,299

UNITED STATES PATENT OFFICE 2,483,299

MEASUREMENT OF ELECTROCHEMICAL POTENTIALS

Frank George Paully, Chatham, N. J.

Application August 25, 1945, Serial No. 612,693

8 Claims. (Cl. 175—183)

The invention relates to a method and an apparatus for the measurement of electrochemical potentials. More particularly it pertains to the determination of hydrogen ion concentrations, i. e. pH values, and oxidation-reduction potentials, and includes correlated improvements and discoveries whereby a marked improvement is obtained.

The measurement of pH values has been performed usually by one of two methods, the colorometric and the potentiometric. These methods, however, are attended by certain inherent errors, limitations, and disadvantages, and in view thereof the colorometric is not as accurate as the potentiometric method. Further, the potentiometric mode of determination has been materially improved through the development of the glass electrode and by the introduction of various suitable electronic circuits.

Moreover, the potentiometric method may be either direct or indirect reading. In the indirect type an unknown cell voltage is balanced against the known voltage of a calibrated slide wire. This procedure utilizes an electronic circuit only as a null indicator. Further, the accuracy of measurement is not determined by the amplifier if there is ample sensitivity, and the circuit is designed and adjusted to obviate introduction of deleterious or spurious currents. The potentiometric method while capable of providing a high accuracy nevertheless is attended by the disadvantage that the operator is required continually to adjust the slide wire in order to follow any pH change in the material. Accordingly, the potentiometric type of instrument finds use mainly in the laboratory.

Development of the direct reading type was primarily for plant use where the operators do not have the skill and training of a laboratory technician. Additionally, a greater tolerance in accuracy can be accepted in a plant operation. The usual direct reading type of instrument presently available is battery operated and has a number of adjustments so that the requirements for a simple meter for plant use are not met. It is a general object of the present invention to eliminate these disadvantages.

An object of the invention is to provide a method and apparatus for the measurement of electrochemical potentials which is characterized by a balanced circuit which permits complete operation from the usual electrical supply line, and thus eliminates batteries.

A further object of the invention is to provide an apparatus for the measurement of pH values wherein the circuit may be adjusted so that there is substantially no flow of grid current when standard electronic tubes are employed.

An additional object of the invention is the provision of a pH meter in which the circuit requires only one operating control, this being accomplished by combining asymmetry and positioning controls.

A still further object of the invention is the provision of a pH meter in which a reference point is automatically checked with each change of material, and in which an electrode system is always connected electrically to the measuring instrument so that the operator cannot fail to read the proper value due to an incorrect position of the switch.

A more particular object of the invention is the provision of a method and an apparatus for the determination of effective acidity or alkalinity in an aqueous solution.

Another object of the invention is the provision of an electrical circuit and mechanical arrangement whereby direct and continuous measurement of pH values may be performed quickly and accurately even by unskilled personnel.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which: Fig. 1 depicts a measuring electrode system of the glass electrode type, Fig. 2 illustrates a circuit arrangement for the determination of pH values with utilization of a glass electrode, Fig. 3 shows a meter having an index pointer, Fig. 4 is a cross-sectional view of the meter of Fig. 3 showing the relative positions of the index pointer 38, the indicating arm 39 and the knob 40 within the meter 19, and Fig. 5 shows the manner in which the amplifying means and the electrode assembly are electrically continuously connected.

The apparatus includes in combination a measuring electrode assembly, an electronic amplifying means, an adjustable grid bias resistor connected to the positive and negative terminals of a power supply and to grids in the amplifying means, a degenerative resistor connected to the negative terminal of a power supply and to cathodes or filaments in the amplifying means, an adjustable balance resistor, i. e. a centering potentiometer, positioned between plate resistors in the amplifier plate circuit, and a measuring device connected across the plate circuit and the outer terminals of the plate resistors.

The electrode assembly suitably is of the glass electrode type, and the amplifying means may consist of a plurality, usually two, electronic amplifying tubes of the same type or characteristics. The adjustable grid bias resistor may be a single resistor having an adjustable connection in contact with a portion thereof, or it may, and preferably does, comprise a plurality of resistors of which one is adjustably connected with the grids of the amplifying tubes. As an adjustable balance resistor, there may be utilized a centering potentiometer which is in adjustable connection with the positive terminal of the power supply and positioned between the plate resistors. For measuring the pH value or hydrogen ion concentration of a material, the apparatus includes a suitable vacuum-tube volt meter which measures the potential difference over the glass electrode, and presents it upon a scale giving pH values directly. Power may be furnished from the usual electrical house supply lines, as 105–130 volt 60 cycle, which is reduced in voltage by a suitable transformer and rectified by a proper rectifying tube.

More particularly the direct reading pH meter of the present invention includes principally a vacuum tube voltmeter and a measuring electrode system. The electrode system may be of various types and the glass electrode assembly shown in Fig. 1 has been found to be especially suitable. It consists of a suitable length of glass tubing 1 usually made of a soda-lime glass to the lower end of which is sealed a glass membrane, preferably Corning 015 glass. Usually the glass membrane is of bulbular form and is sufficiently thin so that the voltage developed across it varies with the hydrogen ion concentration of the material or solution surrounding it. Electrical connection to the inside of the glass membrane is effected by means of a stable half-cell arrangement 3 which consists of a glass tube in which a platinum wire 4 is sealed. That portion extending beyond the glass tube is coated with a silver-silver chloride composition, and is positioned in a suitable solution 5 such as 0.1 N hydrochloride acid, or 0.05 M potassium acid phthalate with decinormal potassium chloride.

The glass measuring electrode is immersed in the material or solution 5a contained in a suitable vessel, as a beaker 6. The electrode assembly includes a reference electrode 7 which is a half-cell constructed from glass tubing 8 in which is mounted a platinum wire 9, a layer of mercury 10 and a paste of mercurous chloride 11 which are held in place by, for example, a cotton plug 12. The space between the half-cell and the outer enclosing tube contains a saturated solution of potassium chloride 13, and connection between the reference electrode and the material or solution being measured may be effected through a minute hole 14. This connection may also be effected by means of a ground glass joint or a porous material. The resistance across such an electrode system may be of the order of 1,000 megohms, and hence it is necessary that the measuring circuit be such that it has a high input resistance, and also that the flow of grid current be reduced to and maintained at a minimum value. Such a circuit is provided by the present invention which achieves a reduction of grid current substantially to zero, e. g. to about $5 \times 10^{-12}$ amperes, and it is illustrated in Fig. 2.

The circuit comprises a glass electrode 1 which is connected through a switch 2 to a control grid 3' of an amplifier tube 4'. A calomel reference electrode 5' is connected to the control grid 6' of the amplifier tube 7'. Cathodes or filaments 8' and 9' of the amplifier tubes 4' and 7' are connected to a degenerative resistor 12' which in turn is connected to the negative terminal of a power supply generally designated as 13'. The positive terminal of the power supply is connected to the plates 15 and 16 of the amplifier tubes through a centering or positioning i. e. adjustable, potentiometer 14', and plate resistors 17 and 18. Any unbalance between the plate resistors will be indicated by a microammeter 19, the sensitivity of which may be adjusted by a variable resistor 20.

Screen grids 21 and 22 of the amplifier tubes are connected to the respective plates 15 and 16, and heaters 23 and 24 are connected to a filament secondary winding 25 of a power transformer 26. Power furnished by the transformer is rectified by means of a rectifier tube 29, and the plates 27 and 28 thereof are connected to a high voltage winding 34 of the transformer. The rectifier tube is provided with a cathode 31 which is connected to a bleeder resistor 32 through a filter resistor 33, and also with a heater 30 which is connected with the secondary winding 25. A center tap contacts the high voltage winding 34 and leads to the adjustable grid bias resistor, or potentiometer, and to the degenerative resistor 12'. A filter condenser 36 is connected across the adjustable grid bias resistor which is illustrated as constructed of the bleeder resistors 32 and 35.

When the apparatus is calibrated, it is permitted to warm up for several minutes and the grid 3' is shorted to grid 6' by closing the switch 2. The centering, or positioning potentiometer 14' is now adjusted until the meter 19 reads at the center of the scale. Grid 3' is then floated by disconnecting the grid cap on the tube 4', and adjustment of the circuit to zero grid current is effected by adjusting the grid bias resistor 35. Thereupon the grid cap mentioned is replaced on tube 4' and a calibrated voltage source is connected to the grids 3' and 6'. A voltage equivalent to the range desired in pH units is now employed, and the resistor 20 is adjusted until the meter reads full scale. The calibration is then complete, and this procedure is necessary only for the initial adjustment and subsequent periodic checks.

The measurement of an electrochemical potential as the hydrogen ion concentration represented by a pH value is accomplished by turning on the power switch 37 and immersing the glass and reference electrodes in a standard buffer solution which may be .05 M potassium acid phthalate having a pH value of 4, or a solution of 0.05 M phosphate buffer having a pH value of 7. The centering, positioning or zero potentiometer 14' is then adjusted until the pointer on the meter reads the same value as that of the buffer solution. The electrodes are now removed from buffer solution, rinsed thoroughly, and immersed in the material or solution whereupon the pH value is read directly upon the meter scale. It is to be observed that when the electrodes are transferred from one solution or material to another the electrode circuit is to be closed so that violent deflections of the meter do not result.

Although in the circuit herein described such deflections are not liable to injure the meter, nevertherless it is desirable to provide a switch whereby the electrodes may be disconnected and the input shorted. Further, the circuit herein described eliminates possibilities of error in operation such as that of having the switch in the wrong position when reading. Because of this, the switch 2 has been mounted on the electrode unit and inasmuch as it is preferably of the spring return type, it automatically returns to the proper operating position. However, this switch might be located on the electrode support whereby it would operate automatically when the electrodes are raised and lowered. It might be desirable in certain instances to include a selector switch so that a convenient selection with respect to several electrode systems could be made, and shorting position could then be provided on the selector switch or an additional tapping switch could be mounted in the meter. Electrode systems for pH measurement usually have a characteristic potential depending on their construction and the expression "asymmetry potential" is employed to designate the variation in voltage which exists between electrodes even of the same type and construction. This "asymmetry potential" is automatically corrected by standardizing the apparatus with a buffer solution of known pH value as above described. In pH meters hitherto constructed such has been accomplished by means of a separate control, but in accordance with the present invention that function is combined with the centering or positioning control potentiometer 14', whereby one control is eliminated, and the adjustment of the apparatus simplified. This also effects a unitary adjustment of electrode potential as may be present in an oxidation-reduction system, and a balancing of potentials in filament and plate amplifier tube circuits.

It has been found that the "asymmetry potential" and the electrical zero on the meter vary from time to time, and accordingly a means of reference is provided in order to mark conveniently the proper operating point. The present invention accomplishes this by means of a manually adjusted index pointer 38 mounted on knob 40 in the meter 19 above the indicating arm 39 (Fig. 3). The index pointer is adjusted into alignment with the indicating arm when the amplifier circuit is shorted by the switch 2 immediately after initial standardization of the meter with the buffer solution of known pH value. An automatic check of this condition is accomplished when the switch 2 is operated for transfer of the electrode to a new material or solution. In the event that the two pointers do not align, the positioning potentiometer 14 is adjusted until such alignment is secured.

The apparatus and procedure hereinabove described include as particular features an adjustable grid bias resistor or control which enables the operator to adjust the circuit in order to reduce the grid current flow to a negligible value; a degenerative resistor whereby the circuit is stabilized in that it maintains a calibration and does not drift or fluctuate with tube or line voltage changes; and a positioning or balance adjusting potentiometer 14' which provides a simple means for correcting variations in the amplifier and electrode circuits through a single control.

The apparatus and method for measuring electrochemical potentials herein described provides a direct reading type of pH meter which is line operated and hence can be operated continuously. Further, an electrode system may be provided which is convenient to use with little likelihood of breakage and elimination of an accompanying clamp or support rod.

As indicated above, it is necessary to adjust pH meters with a standard buffer solution inasmuch as the measuring electrode has an inherent voltage which is not constant from day to day. This adjustment has been effected heretofore by what has been termed an "asymmetry" control knob. The present invention eliminates such a control through the inclusion of a centering or positioning potentiometer. Moreover, the index pointer 38 is placed on the meter scale 41 and a position switch provided whereby the electrical reference point may be automatically checked with each material or solution. A temperature control has not been included but, if desired, either an automatic or manual temperature compensator may be employed or several arcs can be provided on the meter scale corresponding to various solution temperatures.

The apparatus may be mounted in a metal case 6" by 6" by 7" with the power switch and electrical positioning control mounted on a front panel below the indicating scale. However, the position control might also be mounted above the meter or included as a part of the electrode assembly. It will be realized that the indicating scale may be of any desired size, which in turn will determine the overall dimensions. Desirably the mechanical zero will be located in the center of the scale and the meter equipped with a position index pointer. The mounting of the calibrating control and the "free grid" control may be at the side or rear of the case inasmuch as they are used only infrequently.

The apparatus, or meter for measuring pH values, is especially advantageous inasmuch as all batteries have been eliminated and a circuit has been provided which is of such stability in operation that it may be used continuously with only a minimum of attention, and such adjustment as is normally required is accomplished through the medium of one control, or knob.

The apparatus herein described may be modified to a recording type of instrument by associating the indicating meter with, or having it form a part of, a recording apparatus comprising in combination a recording pointer or pen and a movable chart associated therewith. Although the electrical arrangement has been described particularly with respect to the measurement of electrochemical potentials, particularly pH values, nevertheless it will be realized that it may be utilized for the measurement of other variations in electrical potentials in high resistance circuits, for example those occasioned by changes in pressure upon a piezo-electric crystal, spectrophotometry, and bio-electric potentials.

Furthermore, the electrode system may be one in which the glass electrode and the calomel cell are within an inert plastic case which affords complete protection. Additionally the unit may be entirely shielded and so arranged that it may be placed directly into a beaker or other vessel containing the solution without a support. It will be realized, of course, that the apparatus and method described herein are not dependent upon the use of such an electrode system, rather that it may be utilized when other types of electrode systems are included.

Since certain changes in carrying out the above method and in the construction set forth, which embody the invention, may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An apparatus for determining electrochemical potentials which comprises in combination an electrode assembly adapted to generate a voltage dependent upon the pH value of a solution in which said electrode assembly is immersed; an electronic amplifier which is controlled in accordance with said voltage; a direct reading electrical measuring device having an indicator which operates in accordance with a voltage determined by the output of the said amplifier, the combination including a unitary means for adjusting the output voltage with respect to a balancing potential and for simultaneously eliminating the effect of the asymmetry potential of the electrode assembly; and said measuring device being provided with a manually adjustable index pointer by which a variation in the position of the indicator due to the asymmetry potential may be registered.

2. An apparatus for determining electrochemical potentials as defined in claim 1 which includes an adjustable grid bias resistor connected between positive and negative terminals of the amplifier power supply.

3. An apparatus for determining electrochemical potentials as defined in claim 1 which includes a degenerative resistor connected to the negative terminal of the amplifier power supply and to the filament in said amplifier.

4. An apparatus for determining electrochemical potentials as defined in claim 2 in which the unitary adjusting means adjusts a resistance in the cathode plate circuit of the amplifier which controls the voltage applied to the measuring device.

5. An apparatus for determining electrochemical potentials as defined in claim 4 in which the electronic amplifier contains two electronic tubes having plate filament and grid members, and which are arranged in opposed relation and in which the unitary adjustable resistance for controlling the voltage applied to the measuring device forms part of a potentiometer and is connected between plate resistors, which in turn are connected to the plates of the two electronic tubes.

6. An apparatus as defined in claim 5 in which the electrode assembly is connected in the grid circuit of one only of the electronic tubes.

7. An apparatus as defined in claim 5 in which an adjustable grid bias resistor is common to the control grids of the two electronic tubes.

8. An apparatus as defined in claim 1 which includes means for connecting the electrode assembly in a buffer or standard solution in controlling position with respect to said amplifier, the unitary adjusting means then being adapted to be operated to set the electrical measuring device to indicate a predetermined value of the standard solution, means also being provided to disconnect said electrode assembly whereby the measuring device indicates a zero position with respect to said setting thereof, and means for moving the manually adjustable index pointer to correspond with the zero setting of the measuring device.

FRANK GEORGE PAULLY.

REFERENCES CITED

The following references are of record in the file of this patent:

UNITED STATES PATENTS

| Number | Name | Date |
|---|---|---|
| 1,857,216 | St. Clair | May 10, 1932 |
| 1,907,487 | Booth | May 9, 1933 |
| 2,058,761 | Beckman et al. | Oct. 27, 1936 |
| 2,099,298 | Fracker | Nov. 16, 1937 |
| 2,104,211 | Soller | Jan. 4, 1938 |
| 2,225,051 | Heyer | Dec. 17, 1940 |
| 2,320,175 | Dennis et al. | May 25, 1943 |
| 2,372,062 | Dorsman | Mar. 20, 1945 |